United States Patent
Hsiao

(10) Patent No.: US 6,738,329 B2
(45) Date of Patent: May 18, 2004

(54) METHOD OF OPTIMAL POWER CALIBRATION

(75) Inventor: Kuen-yuan Hsiao, Taipei Hsien (TW)

(73) Assignee: Via Technologies, Inc., Taipei Hsien (TW)

( * ) Notice: Subject to any disclaimer, the term of this patent is extended or adjusted under 35 U.S.C. 154(b) by 251 days.

(21) Appl. No.: 10/125,318

(22) Filed: Apr. 17, 2002

(65) Prior Publication Data

US 2002/0150013 A1 Oct. 17, 2002

(30) Foreign Application Priority Data

Apr. 17, 2001 (TW) ...................................... 90109097 A

(51) Int. Cl.$^7$ .............................................. G11B 7/00
(52) U.S. Cl. ................ 369/47.53; 369/47.5; 369/53.11; 369/59.1
(58) Field of Search ............................. 369/47.1, 47.5, 369/47.51, 47.52, 47.53, 47.55, 53.1, 53.11, 53.45, 59.1, 59.11, 59.12, 116

(56) References Cited

U.S. PATENT DOCUMENTS 5,978,335 A * 11/1999 Clark et al. ............... 369/53.34
6,442,115 B1 * 8/2002 Shimoda et al. .......... 369/47.28

* cited by examiner

Primary Examiner—Muhammad Edun
(74) Attorney, Agent, or Firm—J.C. Patents

(57) ABSTRACT

A method of optimal power calibration adapted to an optical storage medium such as a rewritable (CD-RW) disk is disclosed. The method takes the advantages of rewritable characteristic defined in the Orange Book to perform a plurality of optimal power calibration (OPC) processes on the power calibration area allocated in inner track and several recording positions on the rewritable disk. The OPC processes write erasable patterns such as the "Sub Q mode 0" pattern define in Orange Book on data written area(s) of the rewritable disk so that these erasable patterns will be overwritten by sequentially recording data. A relation curve, which indicates the relationships between optimal recording powers of a recording position and the distance from the center of the rewritable disk to the recording position, is then established by using the optimal recording powers measured from the aforementioned OPC processes. Required optimal recording power of any recording position can thus be mapped out from the relation curve under data recording operations.

29 Claims, 5 Drawing Sheets

METHOD OF OPTIMAL POWER CALIBRATION

CROSS-REFERENCE TO RELATED APPLICATION

This application claims the priority benefit of Taiwan application serial no. 90109097, filed Apr. 17, 2001.

BACKGROUND OF THE INVENTION

1. Field of the Invention

The invention relates in general to a method of optimal power calibration. More particularly, the invention relates to a method of optimal power calibration that can derive required optimal recording power for any recording position of an optical storage disk such as a rewritable disk.

2. Description of the Related Art

Rewritable disks (CD-RW) and the recordable disks (CD-R) are currently popular optical storage media for data storage that a rewritable disk can vary or rewrite data stored inside, while the recordable disk can be used to record data only once. Both the rewritable and recordable disks have to undergo an optimal power calibration (OPC) process to obtain required optimal recording powers before being used. FIG. 1 illustrates the operating flow of the conventional OPC process, which is basically performed on a power calibration area (PCA) allocated on an inner track of the disk. In step 100, the recording head jumps to the count area of the power calibration area, while the number of recorded blocks (indicating the number of times that the OPC process has been performed) is read for obtaining the address of the empty power calibration area on the disk in step 110. In step 120, the recording head jumps to the empty power calibration area and then starts to perform an OPC process in step 130. Under this OPC process, the recording head uses 15 (fifteen) different powers to write 15 frames of calibration data (or, OPC pattern, e.g., ATIP (Absolute Time In Pregroove) information) into the empty power calibration area. The recording head jumps to positions where the written operations have just performed so that the calibration data can be read out for determining the optimal recording power in the following steps 140, 150 and 160. The recording head then moves to the count area of the last empty PCA in step 170 and registers that one more OPC process is performed in step 180. Finally, the measured optimal recording power is used to record user's data onto the disk in step 190. All steps shown in FIG. 1 follow the specifications defined in the Orange Book for CD-RW disks. Obviously, the number of times stored in the count area should be increased in step 180 after an OPC process is performed, however, a rewritable disk may be re-burned for recording data about 100 times, typically.

Conventional approach for measuring required optimal recording power is only adapted to a constant linear velocity (CLV) mode rather than to a constant angular velocity (CAV) mode because the recording head follows different linear velocities on the inner and outer tracks under recording in CAV mode. The linear velocities under CAV mode are proportional to the distances between the recording positions (or, data blocks) to the center of the optical storage disk, while the velocities for recording the outer tracks can be as high as 2.5 times than that for recording the inner tracks. Such a difference may cause failures while recording the outer tracks by directly referring the optimal recording power derived from the power calibration area of the inner track. Although CLV mode is now the broadly used approach, however, it significantly consumes more recording time than that of the CAV mode. Additionally, even CLV mode is adopted everywhere of a disk, different materials coated on the inner and outer tracks of the disk should raise different requirements for recording. There is no solution now that overcomes data recording failures arisen from different material coated as aforementioned because the conventional OPC process can only find out the optimal power suitable for the inner tracks rather than the entire optical storage disk.

SUMMARY OF THE INVENTION

The principal object of the invention is to provide a method that takes the advantage of the rewritable characteristic to measure required optimal recording power for the entire rewritable disk. Any recording position on the rewritable disk may derive an optimal recording power suitable for itself when associated data recording operation is performed whether CLV or CAV mode is used. Additionally, those optical storage disks having different materials coated on the inner and outer tracks may easily employs the disclosed method for recording data stored thereon without causing unexpected failures.

The disclosed method can be applied to an optical storage medium such as a rewritable disk having a power calibration area in its inner track as a typical recordable disk does. In one embodiment, an originally optimal power calibration process is performed on the power calibration area allocated in the inner track by writing a plurality of calibration data (or, OPC pattern) burned therein. Thereafter, these written calibration data are read out for determining an originally optimal recording power suitable for the inner track. Several assisted optimal recording powers are successively derived from data blocks selected by following a predetermined rule under a plurality of assisted OPC processes. A relation curve can be built up by using these derived optimal recording powers to indicate the relationships between an optimal recording power of a recording position and a distance from the center of the optical storage disk to the recording position. Finally, a recording operation can be performed to the optical storage medium by mapping out required optimal recording powers from the relation curve. The disclosed method may efficiently upgrade data recording performance whether CAV or CLV mode is employed.

In one embodiment, a "Sub Q code mode 0" pattern defined in the Orange Book is adopted as the OPC pattern for written into the rewritable disk under the assisted OPC processes. This "Sub Q code mode 0" pattern indicates an "erasable state" or "erasable pattern" which may be overwritten by sequentially recording data, so that these OPC patterns recorded under assisted OPC processes will be erased instead of being incorrectly recognized as normal data in the future. The disclosed method takes the advantage of the rewritable characteristics defined in the Orange Book to measure the optimal recording power for any recording position of the rewritable disk. Consequently, all data recording operations can be performed on all recording positions (or, data blocks) of the rewritable disk by mapping out required optimal recording powers from the established relation curve whatever CLV or CAV mode is used.

Both the foregoing general description and the following detailed description are exemplary and explanatory only and are not restrictive of the invention, as claimed.

DESCRIPTION OF THE PREFERRED EMBODIMENTS

Figure 1:
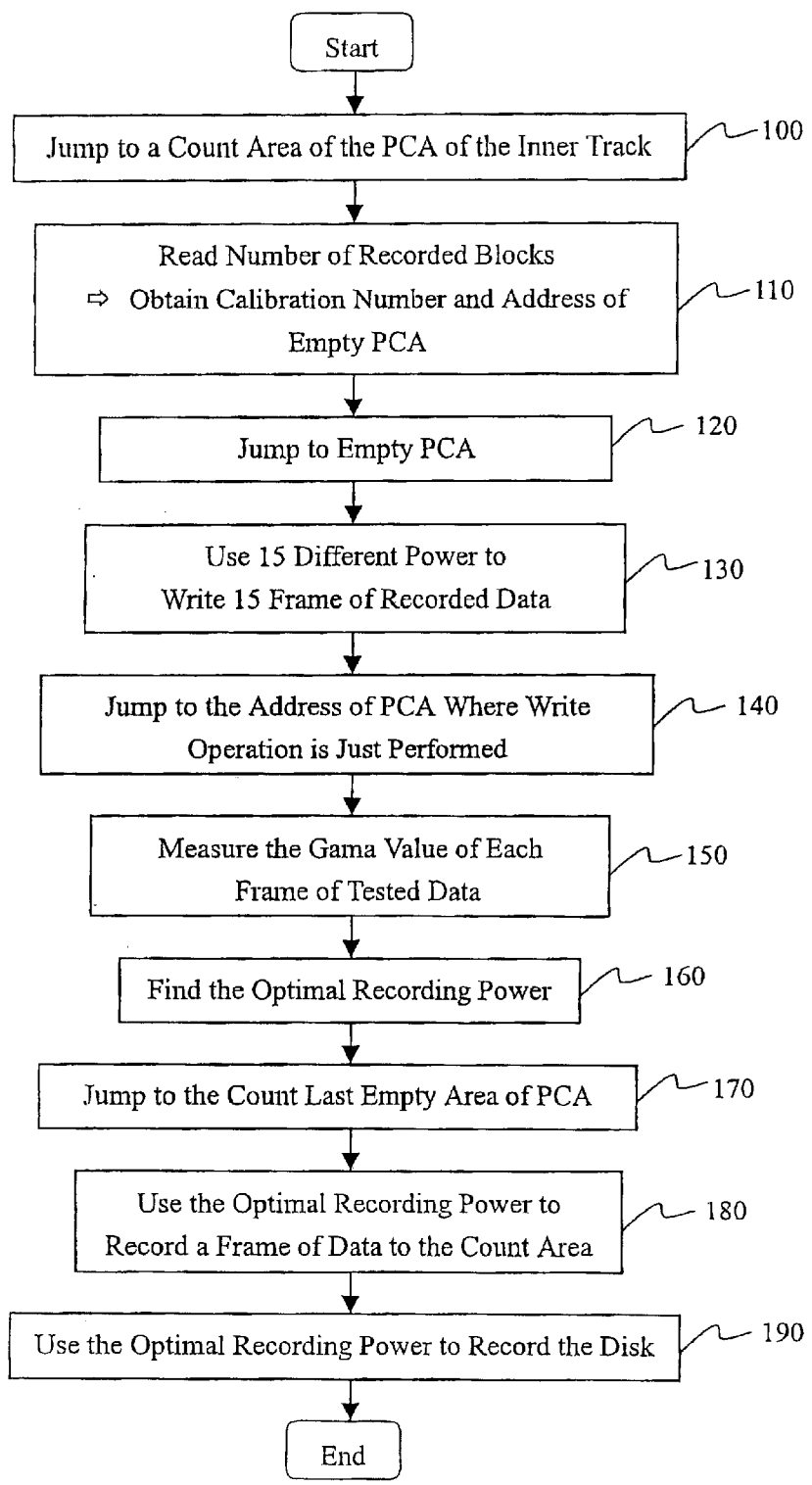
FIG. 1 shows an operating flow illustrative of a conventional method of optimal power calibration.
Figure 2A:
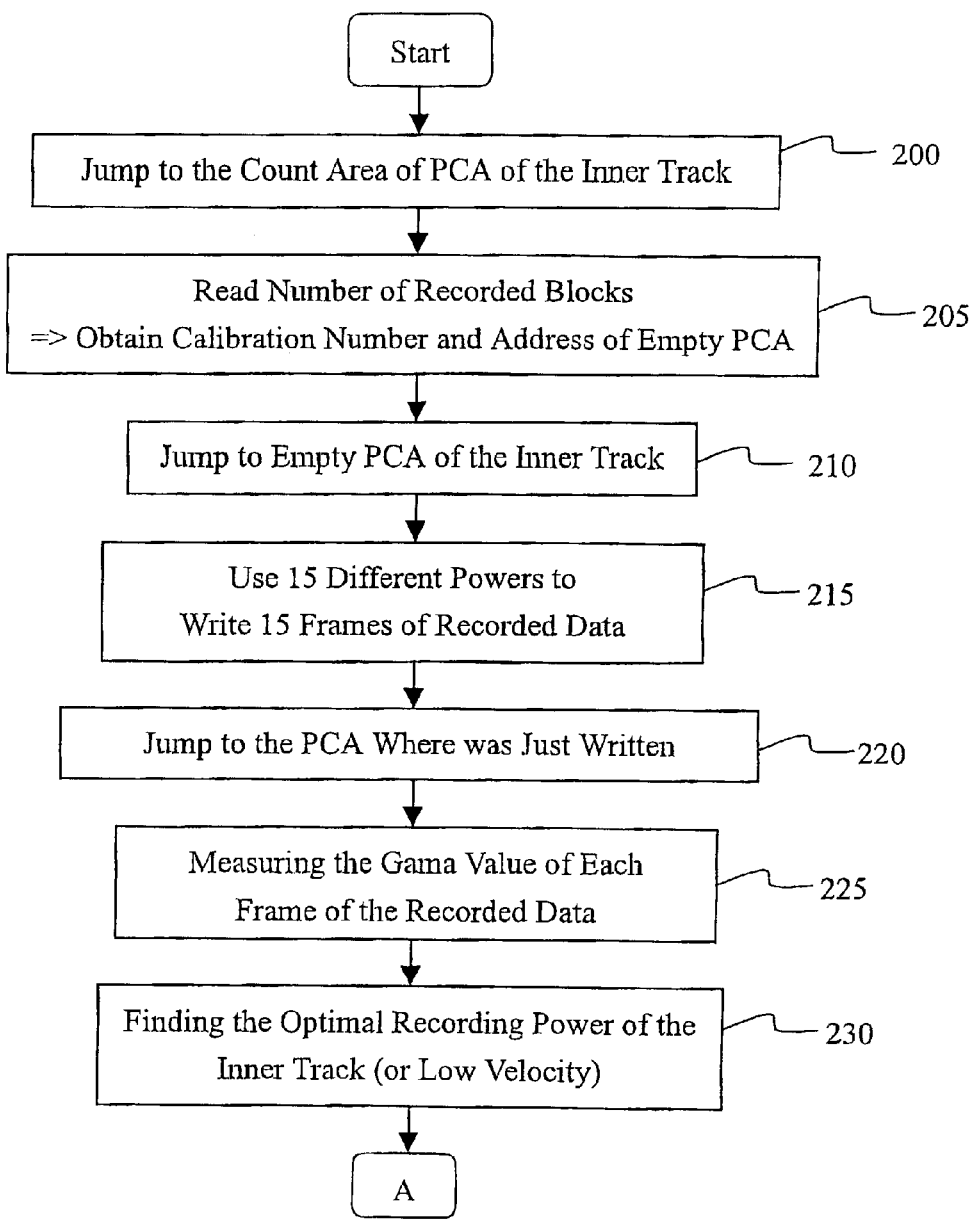
FIGS. 2A and 2B show an operating flow illustrative of the disclosed optimal power calibration method according to the invention.
Figure 2B:
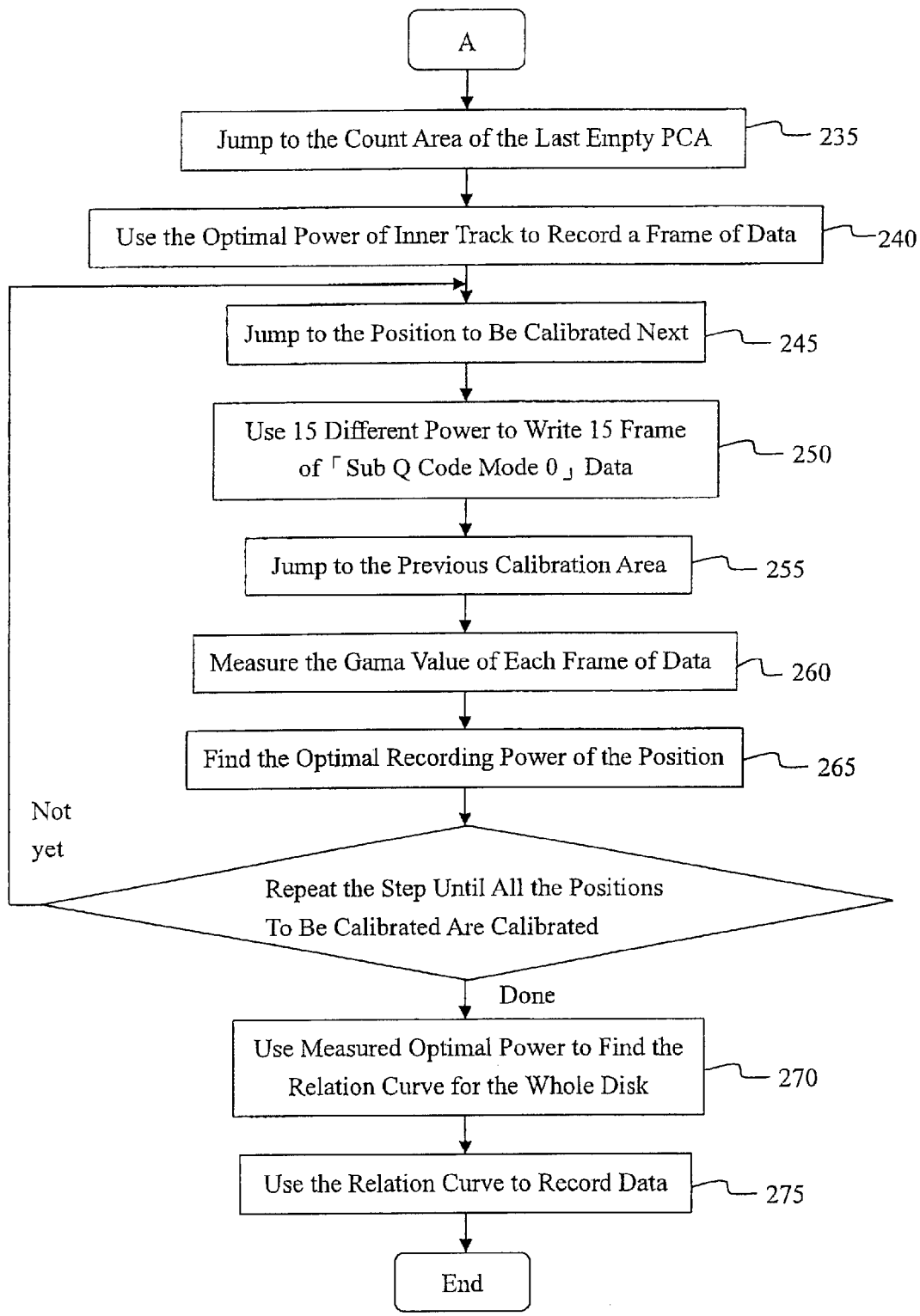

FIGS. 2A and 2B show an operating flow of the optimal power calibration method according to the invention. Referring to FIGS. 2A, 2B and 3, firstly in step 200, the recording head jumps to an original power calibration area 310 in an inner track of the disk to read the number of recorded blocks, which indicates the number of times that the disk has been used for recording data as defined in the Orange Book. Therefore the position (or, address) of next empty power calibration area can then be accessed in step 205. Thereafter, the recording head jumps to the empty power calibration area in step 210 and then starts to perform required OPC process by writing fifteen frames of calibration data (or, OPC pattern) into the empty power calibration area with fifteen different recording powers in step 215. After completing writing operations, the recording head then jumps to the positions where the writing operations have just been performed to read the written calibrated data, so that an originally optimal recording power can be determined through steps 220, 225 to 230 by following the requirements and definitions of the Orange Book. The recording head then applies the originally optimal recording power derived for the inner track to perform a recording operation on the count area in PCA 310 at steps 235 and 240, which gives a registration that the current disk is used for recording data once again. A rewritable disk can be recorded 100 times typically and the number of recorded blocks of the disk is increased in the count area at step 240 by writing one more recorded block.

Figure 3A:
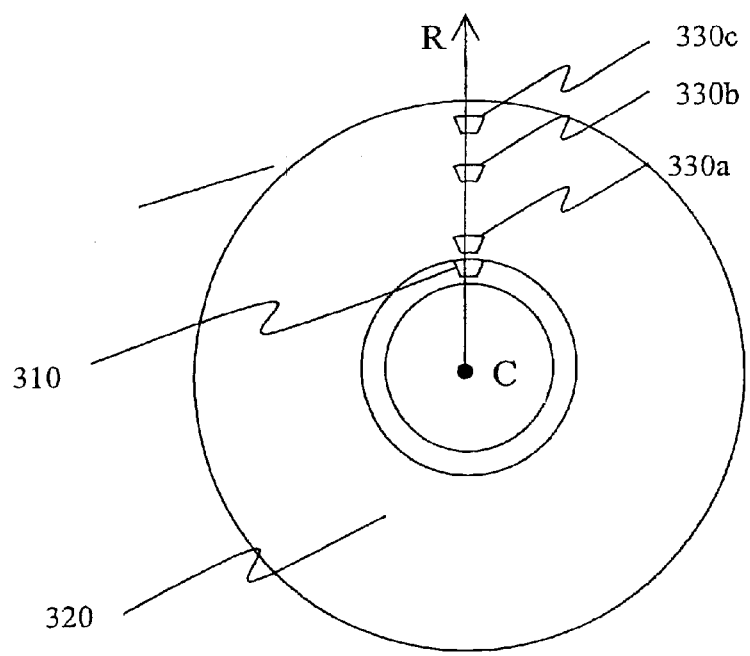
FIGS. 3A and 3B show two approaches for determining power calibration areas from a rewritable disk according to the invention.
Figure 3B:
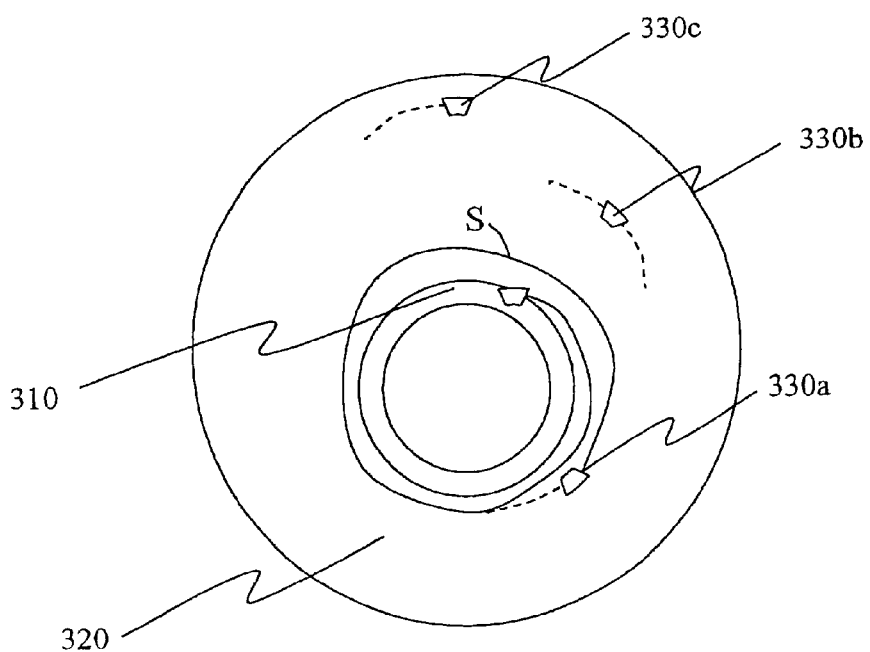

As shown in FIG. 2B, the recording head repeatedly performs several assisted OPC processes on several recording positions of the disk in order to obtain a plurality of assisted optimal recording powers. For clarification purpose, the OPC process performed in the inner track (i.e., performed by following the steps in FIG. 2A) is named "originally OPC process", while the derived optimal recording power is called "originally optimal recording power". In the contrary, each OPC process performed by following the steps in FIG. 2B is named "assisted OPC process", while the derived optimal recording power is called "assisted optimal recording power" hereinafter. Referring now to FIGS. 3A or 3B, the recording head selects some recording positions 330 (or, data blocks, which encompasses 330a, 330b, and 330c) in the data written area 320 (e.g., the program area defined in the Orange Book), while each data block 330 is written by fifteen (15) "Sub Q code mode 0" frames (as defined in the Orange Book) by using fifteen different powers so that every assisted optimal recording power derived from a selected data block 330 can be measured in following steps 245 to 265. Notably, steps 245–265 are repeatedly performed for obtaining a lot of assisted optimal recording powers for all selected data blocks 330. Many optimal recording powers are therefore used to establish a relation curve according to the embodiment. For example, four optimal recording powers (one for originally and three for assisted) are shown and derived from the currently used disk in FIG. 4, wherein the first and last optimal recording powers are derived from PCA 310 and position 330c, respectively. Another two assisted optimal recording powers are derived at two recording positions located inside the disk for recording data stored therein. For example, if a label 330c indicates the last position for deriving assisted optimal recording power, labels 330a and 330b indicate another two positions placed between PCA 310 and recording position 330c. Please note that the originally optimal recording power is firstly measured from steps 120 to 160 in FIG. 2A and then the assisted optimal recording powers are sequentially derived from positions 330a, 330b, and 330c through steps 245 to 265 in FIG. 2B. These four optimal recording powers (associated with points I (relative to PCA 310), a, b, and c, respectively) are employed to establish the relation curve (e.g., the curve indicated by a solid curve I) of the embodiment by means of interpolations. In practice, the relation curve may be built up by following a polynomial equation (e.g., a second order polynomial equation) or even by an optimized line (e.g., the line indicated by a dot line II) derived from these four points I, a, b, and c. A person having ordinary skills in the art should select an equation most suitable for their applications (e.g., CD-RW systems for performing data recording operations, etc.), but all similar arrangements and modifications within the scopes of the embodiments should included in the appended claims. Additionally, the aforementioned positions 330a and 330b may divide the data written area from PCA 310 to position 330c along a radius direction, or divide the data written area from PCA 310 to positions 330c along the spiral track. For example, positions 330a and 330b may be distributed on the distance from PCA 310 to position 330c along a direction indicated by a radius of the rewritable disk (labeled by "R") as shown in FIG. 3A (i.e., from the disk center C to position 330c). Moreover, positions 330a and 330b may be allocated along the spiral direction indicated by the data-recording track of the rewritable disk (the direction labeled by "S" in FIG. 3B). Practically, the aforementioned positions 330a and 330b may be "substantially evenly" (i.e., it need not to "exactly evenly") distributed on the data-recording track or the distance between PCA 310 and position 330c. However, any distribution for allocating positions 330a and 330b may be adapted to the disclosed method. An ordinary person skilled in the art may define a rule or distribution for allocating the positions 330a and 330b beforehand, but all similar arrangements or modifications within the scopes of the embodiments should be included in the appended claims. Notably, although the position 330c indicates the last position for deriving assisted optimal recording power, however, there is still no constraint about where the position 330c is allocated. For example, position 330c may exactly indicate the last recording position for recording current data, i.e., where the position 330c locates based on the quantity of the currently recording data. Furthermore, position 330c may indicate a data block near or adjacent to the last recording position (which may be allocated in or out of the data-recording track for recording current data), or even a position far away from the last recording position, such as the very last recording position of the entire rewritable disk. Additionally, there is no constraint to the numbers of data blocks (i.e., 330a, 330b, 330c) employed for deriving assisted optimal recoding powers. In fact, even a single assisted optimal recording power is adopted for establishing the relation curve. This single assisted optimal recording power may be suggested derived from the position exactly, near, or adjacent to the last recording position according to the currently recording data, however, the position far away from the last recording position still brings satisfactory result. Of course, any assisted OPC process performed on a region out of the area for recording currently data will "leave" the "Sub Q code mode 0" frame. However, this (or these) "Sub Q code mode 0" frame(s) will not be accessed under normal data recording or reading operations, which indicates that no unexpected failure will be arisen in the future. Any ordinary person having skills in the art may vary the embodiments as applications but any similar modification within the spirit of the embodiments should be included in the appended claims.

Figure 4:
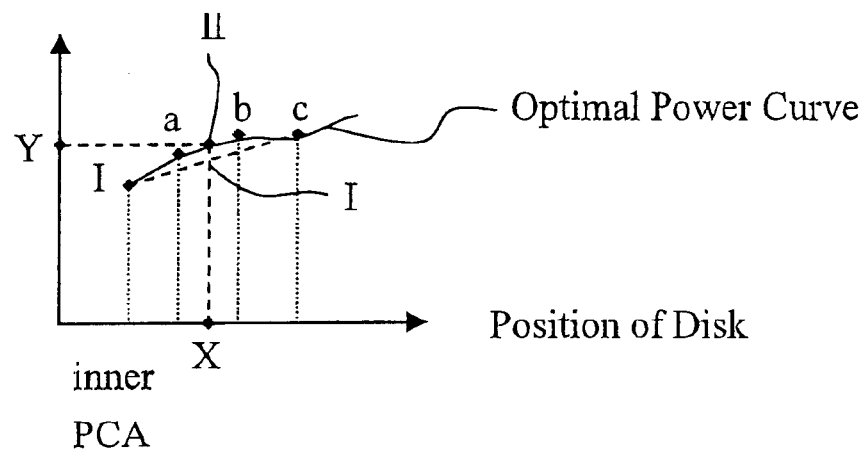
FIG. 4 shows exemplary relation curves illustrative of the relationships between the optimal recording powers and the recording positions in the optical storage disk according to the invention.

As shown in FIG. 2B, the embodiment utilizes the measured optimal recording powers to obtain a relation curve that indicates the relationships between the optimal recording powers and the distances from the disk center C to the recording position by interpolation in step 270. Two exemplary relation curves are depicted in FIG. 4. Required optimal recording power for any recording position can be mapped out while performing associated recording operation in step 275, e.g., an optimal recording power Y can be mapped out from the relation curve I according to a recording position X in FIG. 4. Since the OPC pattern "Sub Q code mode 0" (which indicates an "erasable pattern") is burned on the disk in assisted OPC processes, sequentially recorded data will overwrite these erasable patterns under data recording operations. No incorrectly pattern recognition is arisen by read operations in the future.

The disclosed method uses the rewritable characteristic defined in the Orange Book for rewritable disks to measure an optimal recording power of any recording position on the disk. The recording operation can be performed on all recording positions on the disk by means of their optimal recording powers derived from the relation curve whatever CLV or CAV mode is employed. On the other hand, the disclosed method can be utilized to these rewritable disks having different materials respectively coated on their inner and outer tracks because each one of the assisted optimal recording power may indicate the recording power most adapted to its neighboring area. Additionally, an optical storage disk having single data session or multi data sessions may utilize the disclosed method for recording data stored therein. Notably, the disclosed method may be performed once again each time when a rewritable disk is reused for data recording. As known by an artisan, the characteristic of individual rewritable disk may be affected under different environments (e.g., temperature), however, a rewritable disk may employ all derived optimal recording powers suitable for current characteristics by employing the disclosed approach even the currently established relation curve is different with the previous one. Therefore the disadvantages that different material respectively coated on disk inner and outer tracks and the only optimal recording power derived the inner track of conventional approach is overcome completely.

It is appreciated that people of ordinary skill in the art may apply the disclosed method of optimal power calibration to any kind of rewritable storage medium in addition to the rewritable disk. The disclosed method may be employed to any system used for recording data into rewritable storage medium as a CD-RW system does. An interpolation method is used to obtain the relation curve by referring all measured optimal recording powers, while any skilled person can utilize another approach to obtain various relation curves.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method of optimal power calibration that derives associated optimal recording powers for an entire optical storage medium having rewritable characteristic under a data recording operation, said method comprising:

performing an originally optimal power calibration process on an original power calibration area in said optical storage medium;

obtaining an originally optimal recording power from said original power calibration area;

performing an assisted optimal power calibration process on an assisted power calibration area on said optical storage medium to derive an assisted optimal recording power, wherein an erasable pattern that may be rewritten by said data recording operation is recorded under said assisted optimal power calibration process; and deriving characteristic information illustrative of overall optimal recording powers of said optical storage medium by referring said originally optimal recording power and said assisted optimal recording power.

2. The method according to claim 1, wherein said optical storage medium is a rewritable (CD-RW) disk.

3. The method according to claim 2, wherein said method of optimal power calibration is preformed again when said rewritable disk is reused for recording data.

4. The method according to claim 1, wherein said characteristic information illustrative of said overall optimal recording powers is a relation curve established by using said originally optimal recording power and said assisted optimal recording power.

5. The method according to claim 4, wherein said relation curve illustrates a relationship between an optimal recording power of a recording position inside said optical storage medium and a distance from a center of said optical storage medium to said recording position.

6. The method according to claim 5, wherein said optimal recording power of said recording position inside said optical storage medium is mapped out from said relation curve according to said recording position under said data recording operation.

7. The method according to claim 1, wherein said erasable pattern is a "Sub Q mode 0" pattern define in Orange Book for rewritable (CD-RW) disks.

8. The method according to claim 1, further comprising a system performing said data recording operation to record data into said optical storage medium.

9. A method of optimal power calibration that derives associated optimal recording powers for an entire optical storage medium having rewritable characteristic under a data recording operation, said method comprising:

performing an originally optimal power calibration process on an original power calibration area in said optical storage medium;

obtaining an originally optimal recording power from said original power calibration area;

performing a plurality of assisted optimal power calibration processes on a plurality of assisted power calibration areas on said optical storage medium, wherein each one of said assisted optimal power calibration processes derives an assisted optimal recording power; and deriving a relation curve illustrative of overall optimal recording powers of said optical storage medium by referring said originally optimal recording power and a plurality of said assisted optimal recording powers.

10. The method according to claim 9, wherein said optical storage medium is a rewritable (CD-RW) disk.

11. The method according to claim 9, wherein said method for deriving optimal recording powers is preformed again when said rewritable disk is reused for recording data.

12. The method according to claim 9, wherein said relation curve illustrates a relationship between an optimal recording power of a recording position inside said optical storage medium and a distance from a center of said optical storage medium to said recording position.

13. The method according to claim 12, wherein said optimal recording power of said recording position inside said optical storage medium is mapped out from said relation curve according to said recording position under said data recording operation.

14. The method according to claim 9, wherein each one of said assisted optimal power calibration processes records an erasable pattern that may be rewritten by said data recording operation.

15. The method according to claim 14, wherein said erasable pattern is a "Sub Q mode 0" pattern define in Orange Book for rewritable (CD-RW) disks.

16. The method according to claim 9, wherein said assisted power calibration areas are allocated along a direction indicated by a radius of said optical storage medium.

17. The method according to claim 9, wherein said assisted power calibration areas are allocated along a direction indicated by a data-recording track of said optical storage medium.

18. The method according to claim 9, further comprising a system performing said data recording operation to record data into said optical storage medium.

19. An optical storage disk for storing data including at least one data session comprising:

an original power calibration area in an inner track of said optical storage disk, wherein an originally optimal power calibration process is performed on said original power calibration area to derive an originally optimal recording power; and a data written area for recording at least one erasable pattern while performing assisted optimal power calibration processes that each one of said assisted optimal power calibration processes records one of said erasable patterns on said optical storage disk, said erasable patterns being rewritten by recording data when a data recording operation is performed.

20. The optical storage disk according to claim 19, wherein said optical storage disk is a rewritable (CD-RW) disk.

21. The optical storage disk according to claim 19, wherein a relation curve illustrative of overall optimal recording powers of said optical storage disk is established by using said originally optimal recording power and at least one of said assisted optimal recording powers.

22. The optical storage disk according to claim 21, wherein said relation curve illustrates a relationship between an optimal recording power of a recording position inside said optical storage disk and a distance from a center of said optical storage disk to said recording position.

23. The optical storage disk according to claim 22, wherein said optimal recording power of said recording position inside said optical storage disk is mapped out from said relation curve according to said recording position under said data recording operation.

24. The optical storage disk according to claim 19, wherein said erasable pattern is a "Sub Q mode 0" pattern define in Orange Book for rewritable (CD-RW) disks.

25. The optical storage disk according to claim 19, wherein at least one assisted power calibration area is selected from said data written area, and one of said assisted optimal power calibration processes performed on one of said assisted power calibration area derives one of said optimal recording powers.

26. The optical storage disk according to claim 19, wherein all of said power calibration areas are allocated along a direction indicated by a radius of said optical storage disk.

27. The optical storage disk according to claim 19, wherein said assisted power calibration areas are allocated along a direction indicated by a data-recording track of said optical storage disk.

28. The optical storage disk according to claim 19, wherein portions of said erasable patterns recorded out of an area which records currently recording data associated with said data recording operation under assisted optimal power calibration processes will be left instead of being rewritten by recording data when a data recording operation is performed.

29. The optical storage disk according to claim 19, further comprising a system performing said data recording operation to record data into said optical storage disk.

* * * * *